UNITED STATES PATENT OFFICE.

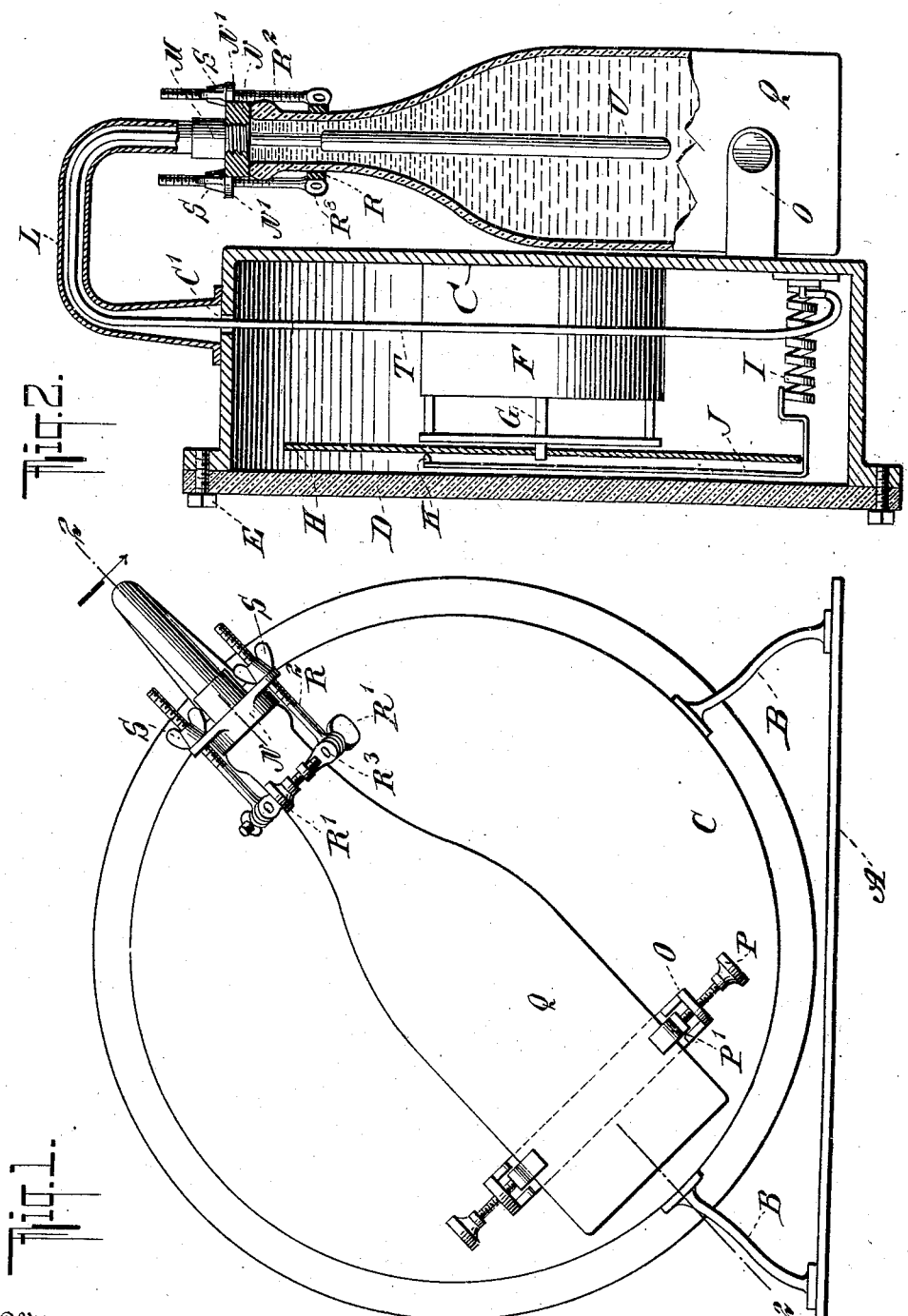

CHARLES J. TAGLIABUE, OF NEW YORK, N. Y.

ATTACHMENT FOR STERILIZING OR PASTEURIZING APPARATUS.

No. 842,981.  Specification of Letters Patent.  Patented Feb. 5, 1907.

Application filed June 7, 1905. Serial No. 264,104.

*To all whom it may concern:*

Be it known that I, CHARLES J. TAGLIABUE, a citizen of the United States, and a resident of the borough of Manhattan, city, county, and State of New York, have invented certain new and useful Improvements in Attachments for Sterilizing or Pasteurizing Apparatus, of which the following is a specification.

My invention relates to apparatus for sterilizing and pasteurizing liquids, and has for its object to provide such apparatus with a device which will accurately record any variation in temperature which may occur in the tank containing the sterilizing liquid.

My invention will be fully described hereinafter, and the features of novelty will be pointed out in the appended claims.

Reference is to be had to the accompanying drawings, in which—

Figure 1 is a rear view illustrating my invention, and Fig. 2 is a section thereof on line 2 2 of Fig. 1.

In sterilizing or pasteurizing processes an endless chain passing over sprocket-wheels is usually employed. The said chain is driven in any suitable and well-known manner and in its travel passes through a tank containing hot water or other sterilizing liquid. On this endless chain are secured wire or other suitable baskets or crates, which are adapted to receive the bottles or other receptacles in which the material to be sterilized is contained, it being understood that these baskets or crates are usually divided into compartments, each compartment accommodating one bottle or other receptacle.

As the mechanism and parts so far described are common in sterilizing processes, I have not deemed it necessary to illustrate them, as they form no part of the present invention.

I will now describe my invention in detail.

Referring to the drawings, A is a base, upon which is supported, by means of legs B, a recording thermometer case or support C of any well-known construction. This thermometer, in addition to the liquid-tight case C, may consist of a transparent front plate D, of glass or other suitable material, secured to the case by means of bolts E. Inside the case C at a convenient point is located the usual clockwork F, having a spindle G, upon which is supported the chart H. A sensitive metal coil I is arranged in said case C and carries the rod or pointer J, having secured to its end the usual stylus K, adjacent to the surface of the chart H. Thus in operation the said chart H is rotated by means of the clockwork F, and the changes in temperature are recorded thereon by the stylus K, as will be more fully described hereinafter. The case C is provided with an opening C', which communicates with a protecting-pipe L, the purpose of which will presently be referred to. At its free end the pipe L is provided with a screw-threaded hollow plug M, upon which is adapted to be screwed the nut N, having ears or lugs N'. On the rear face of the case or support C is secured a bracket O, having hand-screws P, carrying at their inner ends pads P', of metal lined with felt or other suitable material.

Q is the bottle, which has its bottom secured in position in the bracket O by means of the pads P' and screws P. A split metal ring R is placed on the neck of the bottle and is secured thereon by means of a hand-screw R'. The said ring R is provided with several screw-threaded rods R², pivoted to said ring R at R³. The said rods R² carry thumb-screws S and are arranged to be received by the lugs or ears N'. Thus if the thumb-screws S are screwed down the neck of the bottle will be secured in position with its mouth adjacent to the nut N, it being understood that the nut N serves as a closure for the mouth of the bottle. A capillary tube T, of copper or other suitable metal, is connected with the sensitive coil I and passes through the case C into and through the protecting-pipe L. The said tube T further passes through the hollow plug M and then into the bottle Q, where it is connected to the thermometer-bulb U, which is immersed in the liquid to be sterilized.

In operation, supposing that one of the baskets or crates hereinbefore referred to ordinarily accommodates twelve bottles, two of said bottles are removed from the crate or basket and one of them is attached to the recorder in the manner just described. This recorder carrying the bottle is then placed in the crate or basket and takes the place of the two bottles which have been removed. The crate then travels along with the chain, and eventually the said crate and the recorder are immersed and pass through the sterilizing liquid, the temperature of the liquid to be sterilized (and contained in the bottle) as it passes through the sterilizing liquid being recorded upon the chart H in the customary manner. If desired, each of the baskets or crates carried by the traveling chain may contain one of the recorders.

It is to be understood that while I have described my invention in connection with the bottles containing liquid to be sterilized the said invention may be used together with any other receptacles containing material to be sterilized.

Various modifications may be made without departing from the nature of my invention.

I claim—

1. In a sterilizing or pasteurizing apparatus, the combination of a casing, a temperature-recorder within the casing, a thermometer located partly within and partly exteriorly of the casing, and a fastening and protecting device supported by the casing, for securing a receptacle to the casing and protecting the part of the thermometer between the casing and the receptacle.

2. In a sterilizing or pasteurizing apparatus, the combination with the casing, a temperature-recorder within the casing, a protecting-pipe extending from said casing, a securing device at the end of said pipe for securing a receptacle in position adjacent to the pipe, a thermometer member located exteriorly of said pipe and said casing, and a fastening device for securing said receptacle to the casing adjacent to the thermometer member.

3. In a sterilizing or pasteurizing apparatus, the combination with the casing, a temperature-recorder within the casing, a protecting-pipe extending from said casing, a nut located at the end of said pipe and provided with ears, a collar adapted to embrace a portion of a receptacle, rods pivoted to said collar and arranged to engage the ears of the nut and provided with thumb-screws for securing the receptacle in position adjacent to said protecting-pipe, a thermometer member located exteriorly of said pipe and said casing and a fastening device for securing said receptacle to the casing adjacent to the thermometer member.

In testimony whereof I have hereunto set my hand in the presence of two subscribing witnesses.

CHAS. J. TAGLIABUE.

Witnesses:
   JOHN LOTKA,
   JOHN A. KEHLENBECK.